Oct. 5, 1954 J. A. RAJCHMAN 2,691,154

MAGNETIC INFORMATION HANDLING SYSTEM

Filed March 8, 1952 6 Sheets-Sheet 1

INVENTOR
Jan A. Rajchman
BY
ATTORNEY

INVENTOR
Jan A. Rajchman
BY Morris L. Rabkin
ATTORNEY

Oct. 5, 1954 J. A. RAJCHMAN 2,691,154

MAGNETIC INFORMATION HANDLING SYSTEM

Filed March 8, 1952 6 Sheets-Sheet 3

INVENTOR
Jan A. Rajchman
BY Morris Robkin
ATTORNEY

INVENTOR
Jan A. Rajchman
BY Maurice Rabkin
ATTORNEY

Oct. 5, 1954 J. A. RAJCHMAN 2,691,154

MAGNETIC INFORMATION HANDLING SYSTEM

Filed March 8, 1952 6 Sheets-Sheet 5

INVENTOR
Jan A. Rajchman
BY Morris A. Rabkin
ATTORNEY

Oct. 5, 1954 J. A. RAJCHMAN 2,691,154

MAGNETIC INFORMATION HANDLING SYSTEM

Filed March 8, 1952 6 Sheets-Sheet 6

INVENTOR
Jan A. Rajchman
BY Morris L. Rabkin
ATTORNEY

Patented Oct. 5, 1954

2,691,154

UNITED STATES PATENT OFFICE 2,691,154

MAGNETIC INFORMATION HANDLING SYSTEM

Jan A. Rajchman, Princeton, N. J., assignor to Radio Corporation of America, a corporation of Delaware Application March 8, 1952, Serial No. 275,621

15 Claims. (Cl. 340—174)

Figure 1:
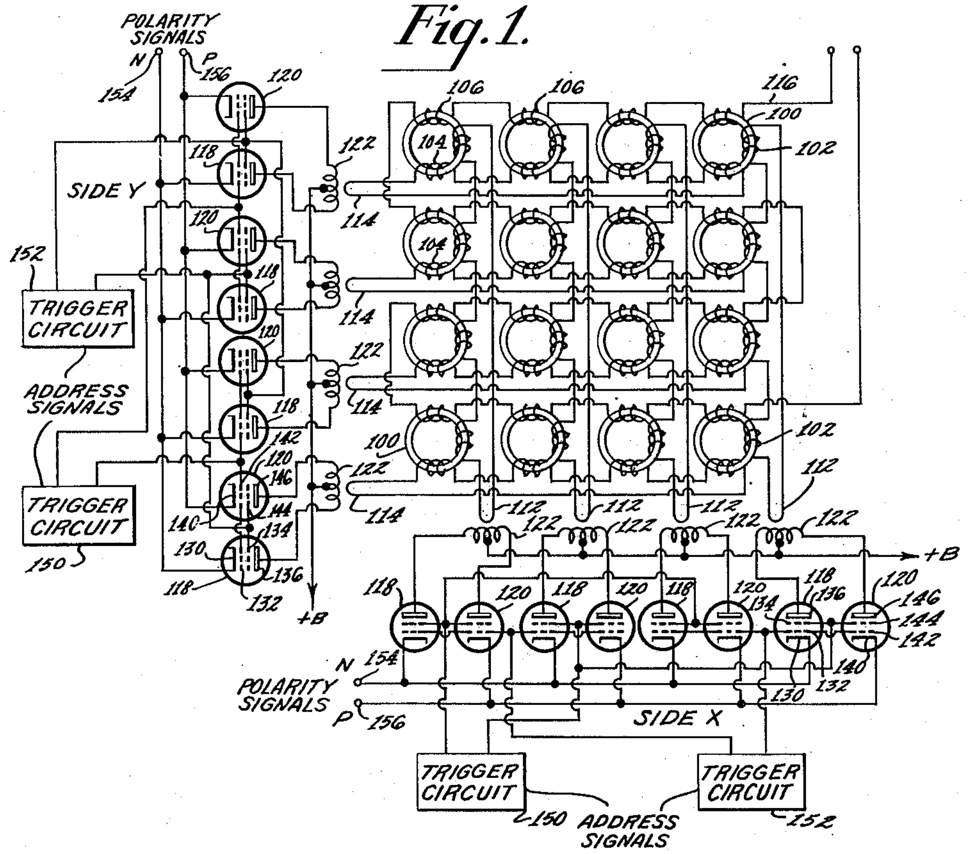

This invention relates to magnetic storage devices and more particularly to an improved random access magnetic storage method and means.

A random access static magnetic memory has been described and claimed in an application by this inventor filed September 30, 1950, Serial No. 187,733 and has also been described in an article by Jay W. Forrester in the Journal of Applied Physics, January 1951, page 44, entitled, "Digital information storage in three dimensions using magnetic cores." In such a memory system a bit of information or a binary digit is represented by the magnetic condition or direction of saturation of a magnetic element. A magnetic element may be magnetic material in the shape of a core or toroidal ring or other suitable shape. The direction of the saturation of an element is altered as required in accordance with the information sought to be stored. The elements which make up the memory are usually arranged in columns and rows. Each element has at least three windings on it. A row coil consists of a series connection of one of the windings on each element in a row of elements. A column coil consists of a series connection of the other of the windings on each element in a column of elements. A reading coil consists of a series connection of all the windings of all the elements. Accordingly, each element is inductively coupled to one row coil, one column coil and the reading coil. Current excitation of a row coil and a column coil, so that each coil produces at least one-half the magnetomotive force required, results in an element inductively coupled to both these coils having its magnetic condition changed, if the element is not already in the condition to which it is being driven. Thus "writing" into a matrix is performed by selecting a row and a column coil which are coupled to a desired element and exciting these coils simultaneously with a pulse of current. Reading the condition or direction of saturation of an element consists of selecting the row and column coil coupled to the element and exciting these coils with current having a given polarity. If the element has the same polarity as that to which the driving field tends to drive it, substantially no voltage pulse is induced in the reading winding. If the element has its polarity changed by the driving field then a voltage pulse is induced in the reading winding.

The opertaion of a magnetic matrix of the type described depends upon the magnetic elements having a rectangular B–H hysteresis loop. With elements having an ideal rectangular loop, the element coupled to the row and column coils being excited will be saturated in the desired direction, while all the other elements coupled to the excited coils will remain perfectly unaffected in whatever state of magnetization they were previously established. Furthermore, with elements having an ideal hysteresis loop, only the selected element on the intersection of the selected coils will produce a reading signal. All the other elements or cores inductively coupled to the selected coils will not provide any contribution to the reading signal.

As a practical matter, the B–H hysteresis loop of materials presently available is not perfectly rectangular. All materials have hysteresis loops with at least slightly rounded corners. As a consequence, demagnetizing effects may occur to the magnetic elements which are not selected but which are inductively coupled to the excited row and column coils. Furthermore, these cores make some spurious contribution to the reading signal which is other than that obtainable from the selected core itself.

It has also been found that, among existing materials, the ones which have the most rectangular hysteresis loop have a relatively higher electrical conductivity than the material with a less rectangular loop. Eddy currents, which are proportional to conductivity, are undesirable because they tend to oppose a driving magnetizing current and thereby limit the speed at which the direction of magnetization can be reversed. From this standpoint it would be desirable to use materials having non-rectangular hysteresis loops for a magnetic matrix.

An object of this invention is to provide an improved random access magnetic storage method and means which permits the employment of magnetic materials having non-rectangular B–H hysteresis loops.

Another object of this invention is to provide an improved random access magnetic storage method and means which substantially eliminates the deleterious effects caused by the non-rectangular B–H hysteresis loop of the material used.

Still another object of the present invention is to provide an improved random access magnetic storage method and means which substantially eliminates demagnetizing effects on non-selected magnetic elements which are caused by driving a selected one of the magnetic elements.

A further object of the present invention is to provide an improved random access magnetic memory which substantially eliminates spurious reading signals.

Still a further object of the present invention is to provide a novel and improved random access magnetic memory.

These and other objects of the present invention are achieved by using an appropriate scheduling of current pulse excitations applied to a static magnetic matrix memory to prevent cumulative demagnetizations from occurring to the magnetic elements which are not selected. Also, these objects may be achieved by using additional windings on the magnetic elements with additional current pulse excitations to improve the excitation ratio between the element selected and the non-selected elements. The desired signal to undesired signal ratio in the reading circuit is improved by winding the reading coil on all the magnetic elements so that the reading windings are balanced along the columns and rows and undesired signals are cancelled.

The novel features of the invention, as well as the invention itself, both as to its organization and method of operation, will best be understood from the following description, when read in connection with the accompanying drawings, in which Figure 1 is a schematic drawing of a presently known static magnetic matrix memory.

Figure 2:
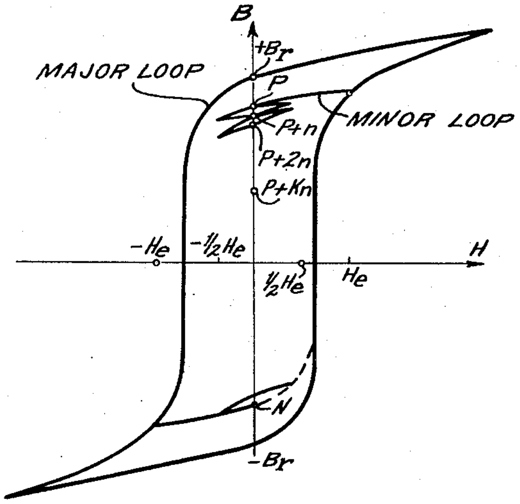
Figure 3:
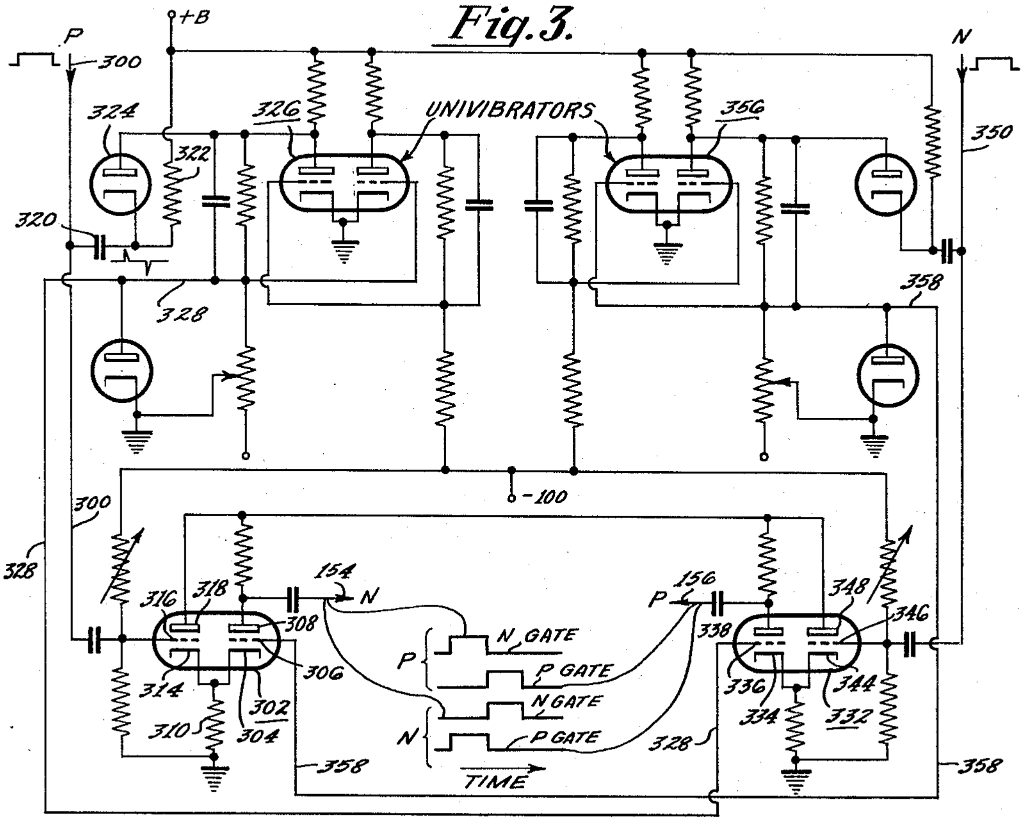
Figure 8:
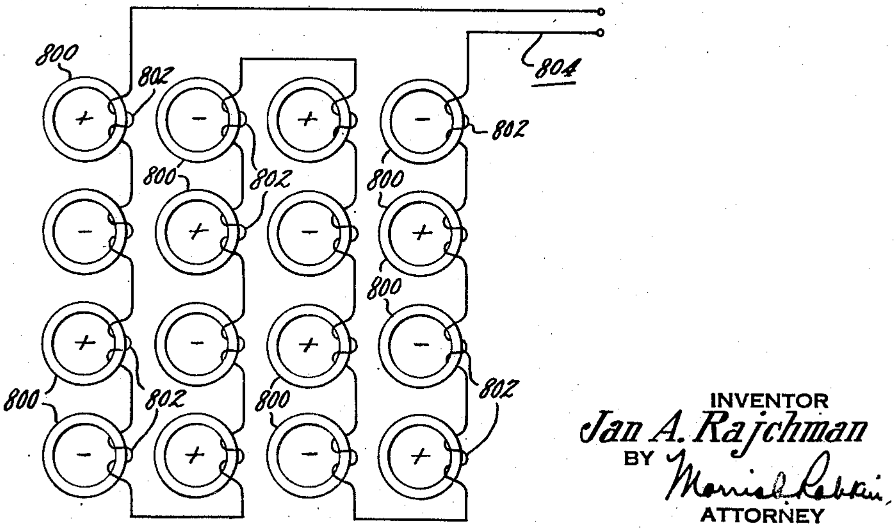
Figure 4:
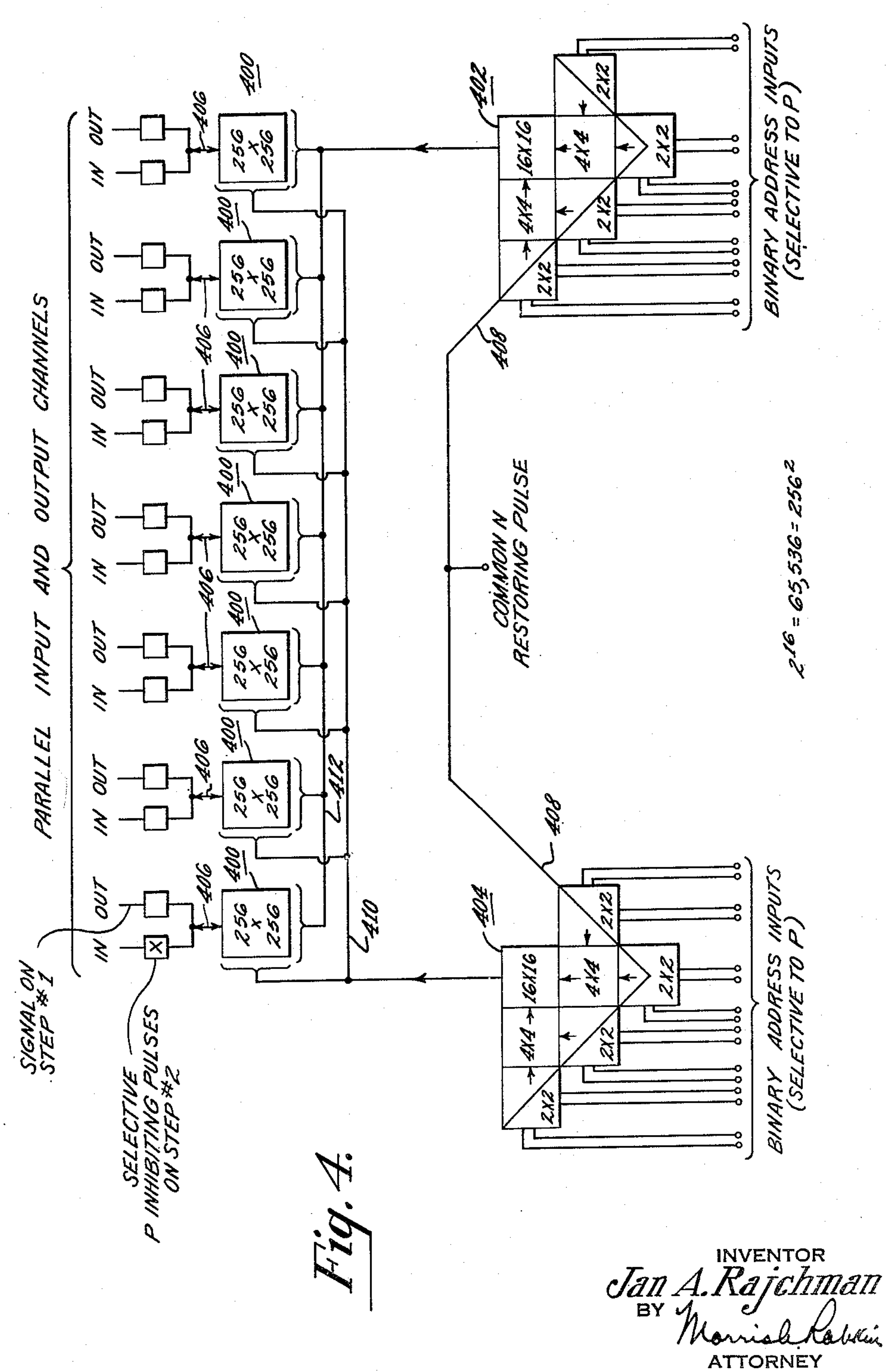
Figure 5:
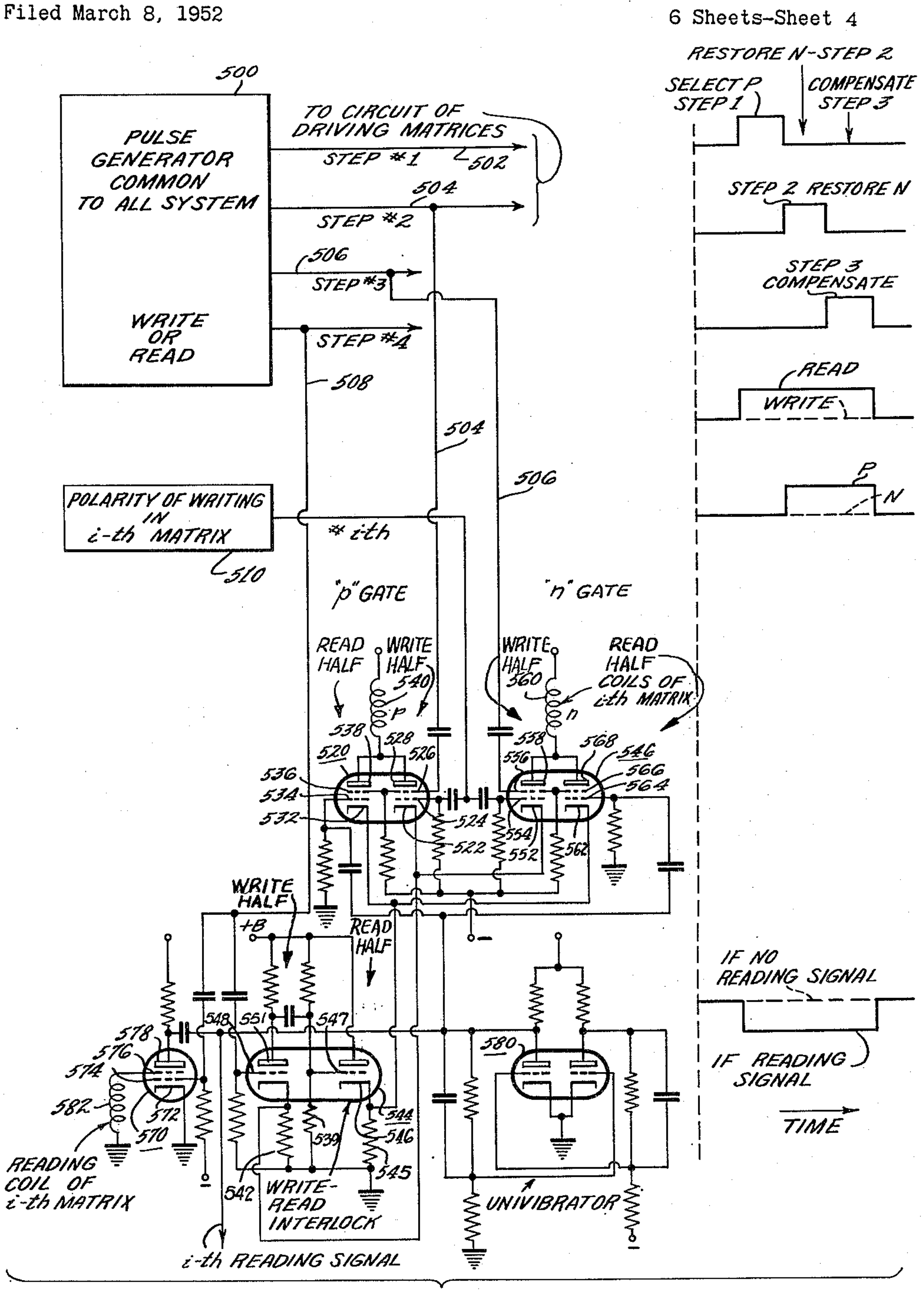
Figure 6:
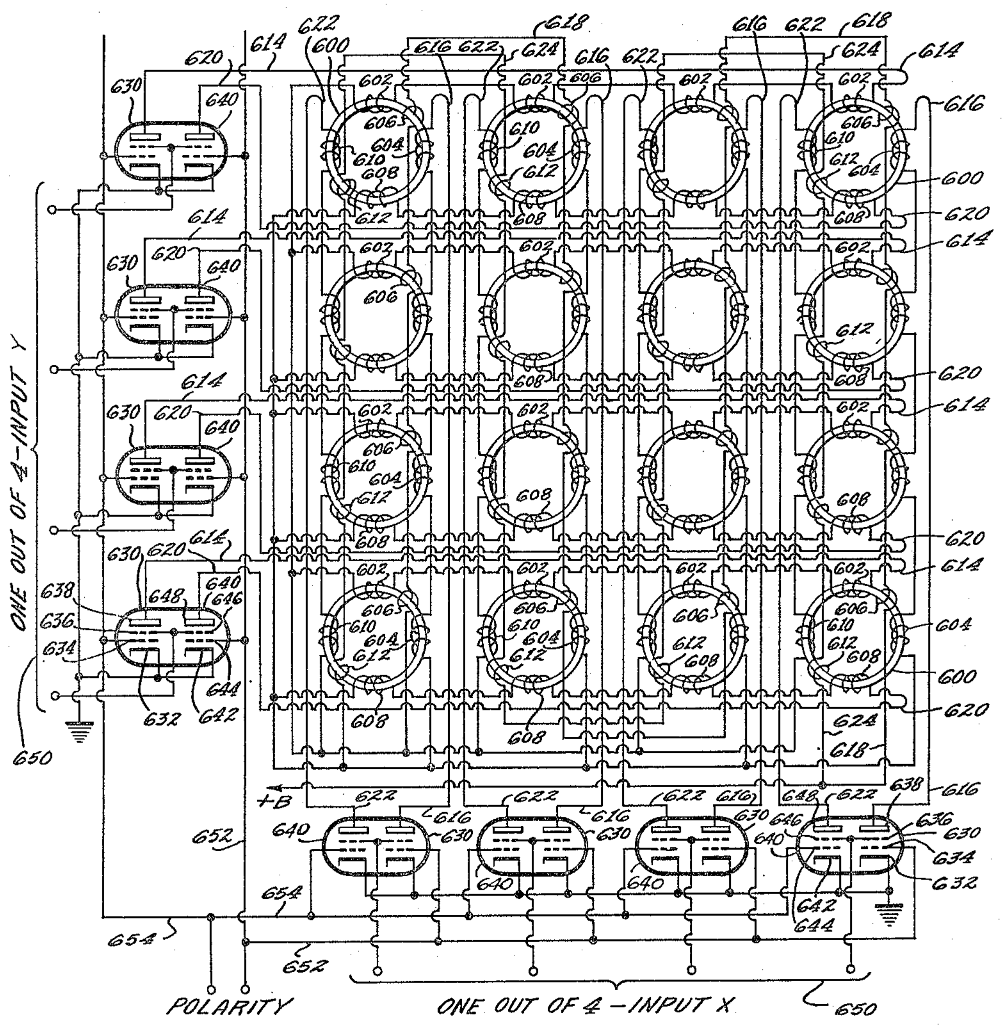
Figure 7:
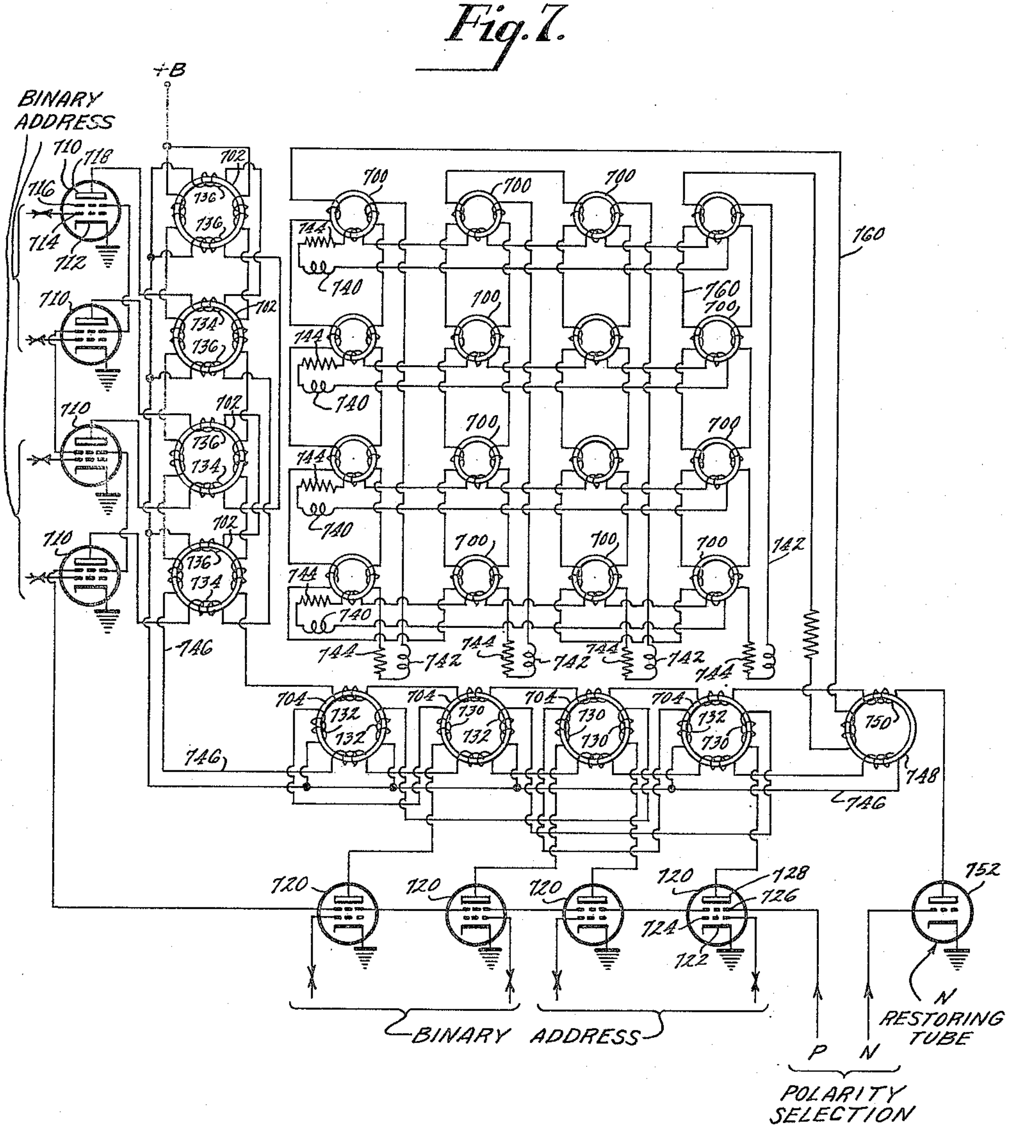

Figure 2 is a typical non-rectangular B-H hysteresis curve for magnetic materials, Figure 3 is a schematic drawing of a circuit for providing the correct scheduling of pulses for preventing successive demagnetizations, Figure 4 is a schematic diagram of a parallel or three-dimensional matrix array driven by cumulative matrices common to all channels, Figure 5 is a schematic diagram of a circuit for providing the correct scheduling of pulses for preventing successive demagnetizations in a memory system including a plurality of parallel driven magnetic matrices, Figure 6 is a schematic diagram of a magnetic matrix employing a compensating winding to prevent successive demagnetizations, Figure 7 is a schematic diagram of a driver magnetic matrix employing a compensating winding to prevent successive demagnetizations, and Figure 8 is a schematic diagram of a magnetic matrix showing a pattern for winding a reading coil on the magnetic cores to improve the reading signal to undesired signal ratio.

Referring now to Fig. 1 of the drawings, there may be seen a two-dimensional array of toroidal, saturable magnetic elements. Each of the elements in the columns of coils has at least one turn of wire constituting a winding around one side of the ring of the toroid. There are three such separate windings on each core or element. First ones of these windings on every element are connected in series to form a separate coil for each column which is known as a column coil 112. Second ones of these windings on every element are connected in series to form a separate coil for each row which is known as a row coil. The third ones of the windings 106 on every element are connected in series throughout as a third coil and connections thereto suitably brought out. This third coil is the reading coil 116. The selection of a row coil 114 and a column coil 112 determines which one of the cores 100 is to receive the full excitation supplied to the selected coils. The vacuum tubes shown are illustrative of one system which may be used to drive a magnetic memory. A pair of tubes 118, 120 are shown connected to a primary winding 122 of a transformer of which a row coil 114 or a column coil 112, as the case may be, constitutes the secondary winding. The polarity of the current applied to a row coil and a column coil is determined by which one of the two tubes 118, 120 connected to a selected primary winding 122 is made to conduct. The tubes 118, 120 each have a cathode 130, 140, an anode 136, 146, a control grid 132, 142 and a screen grid 134, 144. The address or coil selected, is determined by applying signals from the address trigger circuits 150, 152 to both the screen grid and the control grid of two tubes 118, 120, to prime them in condition to become conductive. One pair of tubes 118, 120 which drive the row coils and one pair of tubes 118, 120 which drive the column coils are thus primed. A push-pull signal is applied to the cathodes 130, 140 of these pairs of tubes to determine which one of the pair which is primed will actually conduct. Thereby the polarity of the current in the row and column coil selected is determined. The cathodes 130 of one tube 118 in each pair are connected to a common bus and brought out to a terminal 154 to which signals are applied to render the primed tube conductive to determine the polarity as N. The cathodes 140 of the other tubes 120 are likewise connected to a bus and brought out to a terminal 156 to which signals are applied to render the primed tube conductive and determine the polarity as "P." A "P" or "N" signal, as the case may be, is applied simultaneously to the cathodes 130, 140 of the row coil driving tubes and the column coil driving tubes and accordingly the element to which the selected row coil and the selected column coil are inductively coupled is driven in a P direction or an N direction.

A typical B-H hysteresis curve for magnetic materials is shown in Fig. 2. When a toroidal element is saturated it is left in either condition P or condition N as shown on the curve. The excitation which is applied to a row coil alone and the excitation which is applied to a column coil alone is less than that which is required to drive the magnetic element to either condition P or condition N. This excitation is shown on the curve as either $+\frac{1}{2}H_e$ or $-\frac{1}{2}H_e$. The condition or direction P represents saturation to one polarity of magnetization and the condition N represents saturation to the opposite polarity. The sum of the excitations of the row coil and the column coil, which are applied to a single toroidal element, is sufficient to drive the element to either P or N dependent upon the direction of the current through the row and column windings. The sum of these two excitations, is shown on the curve and may be either $H_e$ or $-H_e$. The non-selected elements coupled to a row or a column coil which is excited are excited at most to excitation $\pm\frac{1}{2}H_e$. The condition of an element is "read" by driving the element with a magnetomotive force which would drive it to one condition, such as P, if it is not there already. The reading winding will detect a change in a condition upon application of the reading excitation if the element is originally in condition N and will detect no change if the element is in condition P.

Further complete details of the operation of the system shown in Fig. 1 may be found by referring to my copending application Serial No. 187,733, filed September 30, 1950, for a "Magnetic Matrix Memory."

Considering Fig. 2, it may be seen that the core or element selected, after excitation, is not exactly at the maximum saturation point designated on the curve as $\pm B_r$, because the value of $\pm H_e$ does not bring the core to total saturation. Furthermore, upon removal of the magnetomotive force the element follows a path along a minor hysteresis loop to such points as P or N. If a core is in a state P when a demagnetizing force of $-\frac{1}{2}H_e$ is applied, a minor hysteresis loop is followed and the core comes to rest at state $P+n$. After K such demagnetizing steps the core may end up in state $P+Kn$. For many materials the point $P+Kn$ can be at $B=0$ or even close to N, even when K is reasonably small, such as 10 or 100. Consequently, a magnetic core or element may be completely demagnetized if other elements coupled to the same row or column coils are being selected and magnetized repetitively in the same direction. Even if the core is not completely demagnetized, but reaches an asymptotic point $P+Kn$ different from N, the ratio of voltages generated in the reading coil upon interrogation may be so small as to provide very poor discrimination or desired to undesired signal ratio.

This demagnetization effect, which is due to multiple small demagnetization currents, can be essentially eliminated with a proper scheduling of pulsing so arranged that for every selection the unselected cores on the selected coils are subject to an equal number of small magnetizing currents of opposite directions. This can be accomplished by exciting the selected coils at first in the opposite direction to the desired one and then in a second time interval in the desired direction. Such scheduling may be seen in Table I below:

TABLE I

DIRECTLY DRIVEN MATRIX

*Schedule of excitations for non-cumulative demagnetizations of unselected cores*

| Operation Desired and Steps | Selected Core State | Unselected Cores on the Selected Lines |
|---|---|---|
| Write P: | | |
| Step 1 write N in $x$ and $y$ | N | $N+n$ or $P+n$. |
| Step 2 write P in $x$ and $y$ | P | $N+n+p$ or $P+n+p$. |
| Write N: | | |
| Step 1 write P in $x$ and $y$ | P | $N+p$ or $P+p$. |
| Step 2 write N in $x$ and $y$ | N | $N+p+n$ or $P+p+n$. |
| To Interrogate: Write P, if signal, write N. If no signal, do not write N. | | |

NOTE.—$n$ and $p$ are representative of the effect of the magnetizing forces applied to the non-selected elements by the selected cores. $x$ is representative of the column coils and $y$ is representative of the row coils.

It is clear that the selected cores will be in the desired state at the end of the second step. The unselected cores on the selected lines will have been subjected to half the magnetizing force or $\frac{1}{2}H_e$, once in one direction, once in the other. Consequently, the path described by such an unselected element on the B-H diagram will be a minor hysteresis loop starting from whichever state, N or P, the core happens to have been previously set, and returning to that point. It is possible that a slight demagnetization will occur due to the fact that the minor loops may be slightly different, depending on the direction of describing them. But this effect is very small and non-cumulative. Consequently, the net effect of the method, consisting of writing first in the opposite to the desired direction, will be to leave all other cores completely unaffected even when the hysteresis loop differs appreciably from rectangularity. This advantage is obtained at the expense of doubling the access time.

There are many ways for obtaining the desired sequence of N—P pulses for writing P or for P—N pulses for writing N. Considering the directly driven matrix shown in Fig. 1, the polarity choice for the writing is at the two terminals 154, 156 which apply signals to the cathodes 130, 140 of the tubes to both $x$ and $y$ sides.

Referring to Fig. 3 of the drawings, these two terminals 152, 154 are connected to the outputs from the double gate tubes indicated as 156P—154N.

If it is desired to write P, a pulse is applied to the P input lead 300. This pulse is conveyed to the grid 316 of a first half of the N double gate tube 302 which is cathode coupled to the second half of the N double gate tube 302 by means of a common cathode impedance 310. A pulse output is obtained from the N gate at terminal 154. Accordingly, the ones of the selected primed tubes 118, 120 are rendered conductive which apply an N pulse to the selected row and column coils. The pulse applied to the P input lead 300 is also applied to a differentiating circuit consisting of a series condenser 320 and a shunt resistor 322. The trailing adge of the differentiated pulse passes through a diode 324 to a univibrator 326. A univibrator is a trigger circuit having one stable and one unstable state. It is tripped from its stable to its unstable state by the application of a pulse, for a time determined by the coupling constants of the trigger circuit. A description of circuits of this type may be found on page 50 in "Time Bases" by Puckle, published by John Wiley and Sons. The univibrator 326 is tripped to its unstable state by the differentiated input "P" pulse. Upon returning to its stable state the univibrator 326 supplies a pulse to the second half of the P gate by way of the lead 328 coupled between an anode of the univibrator 326 and the grid 336 of a double P gate tube 332. Consequently the "N" pulse is followed by a P pulse applied from the P gate tube to the terminal 156 and the selected row and column coil are energized to provide a magnetomotive force in the direction P.

The circuit shown in Figure 3 is symmetrical in operation. Accordingly, if it is desired to write N, an N pulse is applied to the N input lead 350. The P gate tube 332 is first directly excited by the input N pulse being applied to the grid 346 of the first half of the P double gate tube 332, which is cathode coupled to the second half of the P double gate tube, the associated univibrator 356 is turned over to its unstable state by the trailing edge of the differentiated input N pulse and upon its return to its stable state applies a pulse by way of the lead 358 connected from the univibrator 356 to the grid 306 of the second half of the N gate tube. This provides an N pulse after the P pulse. Thus, to write N, first the selected coils are excited in a direction P and then in a direction N. The output pulse sequence provided for an N input pulse and for a P input pulse is shown next to the N and P gate outputs.

In an application for a Static Magnetic Matrix Memory, by this inventor, filed on December 29, 1951, Serial No. 264,217, there is shown, described and claimed, a system for driving a static magnetic matrix by employing other magnetic matrix systems, one of which is coupled to the row coils and is known as a row driver matrix, and the other of which is coupled to a column coil and is known as a column driver matrix. The central matrix is the information holding matrix. The driving matrices perform a switching function and do not hold any information. One system, described in the aforesaid application, for driving the information holding matrix by the row and column driver matrices is to first drive the row and column driver matrices in one direction, regardless of the desired polarity of writing, and to restore the row and column driver matrices to their original condition, either successively or simultaneously, depending upon whether it is desired to leave the driven element in the central matrix in the condition to which it is driven or the opposite condition. More specifically, if the original driving direction is P, and if it is desired to leave a selected information holding matrix element in condition P, then the row driver and column driver matrices are sequentially restored by being driven to condition N sequentially. If it is desired to leave the information holding matrix in condition N, then the row and column driver matrices are simultaneously restored to condition N. It will be seen that in writing P in a selected element, the non-selected elements coupled to the selected coils first received a magnetomotive force in the P direction and then received a magnetomotive force in the direction N. Similarly, in writing N in a selected element, the non-selected elements first receive a magnetomotive force in direction P, then in direction N. Table II shows a schedule of pulses for a matrix driven by matrices and also shows the demagnetization effects on the elements which are not selected.

TABLE II

*Schedule of pulses for matrices driven matrix and demagnetization effects on unselected cores*

| Desired Operations and Steps | Driving Matrices—P on selected lines; N restoration of whole side | | State of selected core in main matrix | State of Unselected core on selected lines |
|---|---|---|---|---|
| | Side $x$ | Side $y$ | | |
| Write P 1 | P | P | P | (P or N) + $p$. |
| Write P 2 | N | ---------- | P + $n$ | (P or N) + $p$ + $n$ ($x$). |
| Write P 3 | ---------- | N | P + 2$n$ | (P or N) + $p$ + $n$ ($y$). |
| Write N 1 | P | P | P | (P or N) + $p$. |
| Write N 2 | N | N | N | (P or N) + $p$ + $n$ ($x$ and $y$). |
| Interrogate 1 | P | P | P | (P or N) + $p$. |
| If signal 2 | N | N | N | (P or N) + $p$ + $n$. |
| If no signal 2 | N | ---------- | P + $n$ | (P or N) + $p$ + $n$ ($x$). |
| 3 | ---------- | N | P + 2$n$ | (P or N) + $p$ + $n$ ($y$). |

In this system there is no loss in writing time and very small loss from demagnetization. However, there is a small loss in discrimination with respect to a directly driven matrix in the reading signal. The driving to P, while interrogating, does give a slight signal when the selected core is at P+2$n$. However, the ratio of change of flux from N to P to that of P+2$n$ to P is very large and this loss of discrimination is small compared to the loss due to the signals from all other cores.

Reference is now made to Figure 4 of the drawings, which is a schematic diagram of a parallel array of information holding matrices being driven by a common set of driving matrices. The common set of driving matrices consists of a cumulative array of column driver matrices and a cumulative array of row driver matrices. Figure 4 of this application corresponds to Figure 9 of the drawings in application Serial No. 264,217 by this inventor for a Static Magnetic Matrix Memory.

Reference is also made to the article by Jay W. Forrester, which is identified above herein, for a three-dimensional arrangement for storing of a word consisting of a number of bits. A brief description of the method of achieving such storage consists of having a set of matrices in parallel which have their row and column coils excited in parallel so that the same magnetic element is selected in all the matrices. In addition, each core has a third winding connected in series throughout any one set of cores in any $x$—$y$ plane to provide an inhibiting coil. An inhibiting current pulse of the same amplitude but opposite direction as the exciting current pulse is sent through all of these inhibiting coils except the ones coupled to the matrix set in which the storage is desired.

Referring to Fig. 4, there is shown a schematic diagram of a system wherein a parallel array of main or information holding matrices 400 are driven by a set of cumulative column driver matrices 402 and a set of cumulative row driver matrices 404. The matrix arrays are each represented by a rectangle having inscribed thereon the number of elements or magnetic toroids in the array. Each one of the main arrays 400 has associated therewith an inhibiting winding represented by lead 406 which is common to all the cores which are alined in a "$z$" plane. The driver arrays have a common N restoring winding 408. The highest order array of the cumulative row driver arrays has each of its elements connected to a different row. Each of the corresponding rows in the main array are coupled to row coils which are connected in parallel, as represented by lead 410. Therefore, excitation may be applied simultaneously to all the row coils in all the main arrays which are connected to a single element in the highest order row driver array. The columns' highest order driver array likewise has each one of its elements inductively coupled to column coils in each one of the main driven arrays which are correspondingly positioned and connected in parallel as represented by a lead 412.

Consider now, one information holding matrix of a set of matrices driven by cumulative matrices, as shown in Figure 4. Let us assume that the elements of the selected matrix each has a winding connected in series throughout, such as the inhibiting coil. Now let the row and column driving matrices 402, 404 go to P simultaneously, by applying selective current pulses to the inputs to these matrices. Then all of the selected cores in the main matrices will go to P. However, if an inhibiting pulse is applied to the inhibiting coil 406 in any one of the matrices in the direction N, no core in such matrix will change. Similarly, when the driving matrices 402, 404 are simultaneously driven to N by restoring pulses on the common N winding 408, the selected cores of the main matrices are driven towards N. If an inhibiting pulse in direction P is applied to the inhibiting coil 406, on any one of the matrices, no core in such matrices is driven towards N. In performing the second step the elements in the driving matrices are restored to N.

During this second step some of the parallel matrices are subject to an inhibiting pulse "*p*" sent through the inhibiting coils (equal to the excitation on the selected line). Others of the parallel matrices are not subject to the inhibiting pulse. This, of course, is determined by whether or not it is desired to register P or N in the core selected in each one of the main matrices 400. If, in addition to the procedure set forth for writing in the three-dimensional matrix system, an additional or third step is added which depends on the nature of step 2, a system is obtained which is free from partial demagnetizations in the same direction. This system can be seen by examining Table III set forth below. Step 3 consists of the addition of an "*n*" pulse which is in opposite direction to the "*p*" inhibiting pulse. This additional step is used only if there was an inhibiting pulse *p* in step 2. It compensates for the effects of that inhibiting pulse in all unselected cores whether or not coupled to selected coils. The compensating pulse *n* may be sent through the same compensating winding as *p*, but it may also be convenient to have another special winding for it.

TABLE III

*Schedule of pulses for parallel matrices driven by a single set of driving matrices*

| Driving Matrices—P on Selected Lines; N Restoration Both $x$ and $y$ set | Inhibiting Pulses on Individual Main Matrices | State of Selected Core(s) | State of Unselected Cores on Selected Lines | State of Unselected Cores on Unselected Lines |
|---|---|---|---|---|
| Writing: | | | | |
| Step 1—Selective P | | P | (P or N)+$p$ | (P or N.) |
| Step 2—Restore N | $p$ if desired to write P | P+$n$ | (P or N)+$p$ | (P or N)+$p$. |
| | if desired to write N | N | (P or N)+$p$+$n$ | (P or N.) |
| Step 3 | $n$ if $p$ in Step 2 | P+2$n$ | (P or N)+$p$+$n$ | (P or N)+$p$+$n$. |
| | if no $p$ in Step 2 | N | (P or N)+$p$+$n$ | (P or N.) |
| Interrogating: | | | | |
| Step 1—Selective P | | P | (P or N)+$p$ | (P or N.) |
| Step 2—Restore N | $p$ if no signal in Step 1 | P+N | (P or N)+$p$ | (P or N)+$p$. |
| | if signal in Step 1 | N | (P or N)+$p$+$n$ | (P or N.) |
| Step 3 | $n$ if $p$ in Step 2 | P+2$n$ | (P or N)+$p$+$n$ | (P or N)+$p$+$n$. |
| | if no $p$ in Step 2 | N | (P or N)+$p$+$n$ | (P or N.) |

Reference is made to Fig. 5 where there is shown a schematic diagram of a circuit for providing the proper schedule of pulses for the *i*th one of a set of parallel driven matrices to provide non-cumulative demagnetization. It is assumed that a separate *p* and *n* winding is being used for the inhibiting and compensating pulses. A pulse generator 500 generates a sequence of pulses 1, 2 and 3 which are common to the entire memory. The time sequence of these pulses may be seen by observing the pulse wave shapes adjacent the leads coming out of the rectangle 500 representative of the common pulse generator. Such a pulse generator 500 may be an oscillator driving a counter or a series of univibrators which drive each other. Apparatus for obtaining the pulse sequence provided by the pulse generator are well known in the art. The leads 502, 504 for steps 1 and 2 are connected to apply a step one and then a step two pulse to the driver matrices shown in Figure 4. The step one pulse has the effect of ultimately driving the selected cores in the main matrices to P. The step 2 pulse has the effect of ultimately restoring the selected cores to N, in the absence of an inhibiting pulse. Another rectangle 510 is provided which is representative of a pulse source which is used to provide a pulse for the *i*th matrix with the occurrence of a pulse upon step 2 if it is desired to write P. This pulse source also may be a trigger circuit of the type well known in the art.

A first double tetrode 520, referred to hereafter as a *p* gate tube, has the step 2 pulse as well as the pulse from the writing polarity source simultaneously applied to the control grid 524 and screen grid 526 of the write half of the *p* gate tubes. This has the effect of rendering the tube conductive, thus drawing current through the load 540 connected to the tube anode 528. The load 540 is the *p* winding or inhibiting winding. The current drawn through the tube passes through a cathode load resistor 542 which is common to the write half of a double triode known as the write-read interlock 544 and to still another tube which is the write half of a double tetrode 546 which is used as an *n* gate tube. Thus the current drawn through the common cathode resistor 542 serves to keep biased off both the write-read interlock 544 write half and the write half of the *n* gate tube 546. The effect of the current through the *p* winding 540, as previously indicated, is to maintain the selected element in the *i*th main matrix at condition P by neutralizing the magnetomotive force tending to drive it to condition N.

At the termination of the step 2 pulse a step 3 pulse is provided from the common pulse generator. This pulse is applied to the screen grid 556 of the write half of the double tetrode *n* gate tube 546 to which half the common cathode bias resistor was connected. The pulse from the writing polarity source 510 is also applied to the control grid 554 of this tube. As can be seen from the pulse diagram, the pulse from the writing polarity source has a duration equal to that of the step 2 and step 3 pulses. Therefore, at the termination of the step 2 pulse the *n* gate tube 546 write half is rendered conductive and draws a load current through its load 560 which is the compensating coil or *n* winding. Thus a compensating current is applied to the *i*th matrix if P was written into a selected core and no compensating current is applied if N was written into a selected core.

The read halves of the *p* gate 520 and *n* gate 546 are biased off by the read half of the write-read interlock 544. This biased-off condition is maintained by connecting the cathodes 532, 562, 516 of the three tubes together and using a common cathode bias resistor 545. The read half of the write-read interlock tube 544 is maintained conducting by the positive signal applied to the grid 547 of the tube from the two voltage divider resistors 537, 539.

If it is desired to read, a sequence of pulses in accordance with that shown in Table III under "Interrogating" must be provided. Simultaneously with the application of a step 1 pulse, a step 4 pulse is applied from the common pulse generator 500. The step 4 pulse has a duration equal to that of the step 1, 2 and 3 pulses. It is applied to the grid 548 of the write half of the write-read interlock tube 544, thus rendering it conductive and biasing off the write halves of the *p* gate and *n* gate tubes 520 and 546 which write halves are cathode coupled to the write-read interlock tube 544 write half. The negative signal resulting at the anode 551 of the write half of the write-read interlock 544 is applied to the grid 547 of the read half of the tube, rendering it non-conductive. This removes the hold-off bias from the cathodes 532, 562 of the read halves of the *p* and *n* gates. The step 4 pulse is also applied through lead 508 to the grid 574 of a detecting tube 570 used to detect the condition of the selected element being read, thus priming the tube for conduction. The tube has its anode 578 coupled to a univibrator 580 of the type described in Figure 3. The screen grid 576 of the detector tube is coupled to the reading coil 582. When the step 1 pulse is applied to the driving matrices, a magnetomotive force is applied to the element selected in the *i*th matrix to drive it to condition P. If the element is already in that condition, no voltage is induced in the reading coil 582. When the step 2 pulse is applied to the driving matrices they apply a magnetomotive force to the selected element which tends to drive it to condition N. However, the step 2 pulse is also applied to the screen grid 536 of the read half of the *p* gate double tetrode 520. The tube is rendered conductive, thus providing an inhibiting current which keeps the selected element in condition P. The step 3 pulse is applied to the screen grid 566 of the read half of the *n* gate double tetrode 546. This renders the tube conductive, drawing a current through its anode load 560, thus providing a compensating current for the *i*th matrix.

If the magnetic toroid selected to be read in the *i*th matrix is saturated in direction N to begin with, then when the step 1 pulse is applied, there is a voltage induced in the reading coil 582 and the detecting tube 570 which was primed by the 4th step pulse is rendered conductive. The tube 570 supplies a negative pulse which is applied to the univibrator 580 and drives it to its unstable condition. The duration of this unstable condition as shown by the waveshape is at least for the duration of the second and third pulse. The univibrator provides a negative pulse output which is applied to the grids 534, 564 of the reading responsive halves of the *p* gate and *n* gate tubes and maintains them non-conductive during the occurrence of the second and third step pulses. Accordingly, the selected core in the *i*th matrix is restored to the condition N. It will be noted that for this type of scheduling, the selected core is either at N of P+2*n* and that all unselected cores receive an equal number of *p* and *n* demagnetizing pulses. This method of eliminating demagnetization lengthens the access time from two to three magnetizing steps.

Another method of utilizing material with B–H hysteresis loops which deviate appreciably from the rectangular form consists of increasing to 3 to 1 the ratio of the effective drive of a selected core to that of an unselected core. This method is explained in detail in my copending application Serial No. 187,733, filed September 30, 1950, and entitled "Magnetic Matrix Memory." It consists of sending through all the non-selected coils (row and column coils) an opposing excitation equal to one-third of the excitation being sent through the selected coils. This requires a fairly complex circuit arrangement, since an individual circuit is required for each coil to produce this one-third compensating excitation. The same result may be accomplished by having a compensating coil conductively coupled to all magnetic elements in the form of a winding on each element connected in series to form a compensating winding. Now, if the selected row and column coil excitations are increased from one-half to two-thirds of the total excitation required for polarity reversal, and an opposing excitation of −⅓ is sent through a single compensating winding, a 3:1 discrimination is obtained. A table is shown below which compares the original "2-to-1" system with a system using one-sixth the excitation required for reversing polarity which is applied to all the unselected lines and a system with a single compensating winding on each element wherein one-third the excitation is applied to this compensating coil.

TABLE IV

| | Original "2-to-1" System | System with Opposing ⅙ excitation in Unselected lines | System with single compensating winding coil on each element |
|---|---|---|---|
| Selected lines | ½ | ½ | ⅔ |
| Unselected lines | | ⅙ | |
| Compensating winding with coil on each element all in series | | | −⅓ |
| Selected element (S) | ½+½=1 | ½+½=1 | ⅔+⅔−⅓=1 |
| Unselected element on selected lines (US) | 0+½=½ | −⅙+½=⅓ | ⅔−⅓=⅓ |
| Unselected element in unselected lines (U) | 0 | 0−⅓=−⅓ | −⅓=−⅓ |
| Discrimination | 2 | 3 | 3 |

It is worth noting that a single compensating circuit accomplishes an improvement in discrimination which comes about from the use of the full range of excitation between $\pm H_e$ rather than just the range of from 0 to $+H_e$ or from 0 to $-H_e$.

Reference is now made to Fig. 6, which is a schematic diagram of a magnetic matrix employing a compensating winding to prevent successive demagnetization. The system shown comprises a directly driven magnetic matrix wherein two row coils 614, 620 and two column coils 616, 622 are inductively coupled to each magnetic core 600 to provide for both polarities of magnetic saturation. Of course, the sense of the two row coil windings is opposite to each other; and similarly for the two column coils. A compensating winding 618, 624 is also provided for each polarity of writing so that when it is desired to write positive, a negative compensating winding 618 is excited and when it is desired to write negative a positive compensating winding 624 is excited. The compensating windings are connected between a source of B+, from which current for the driving tubes is drawn, and the positive and negative row and column coils which in turn are connected to the respective vacuum tubes 630, 640 as anode loads. Accordingly, by selecting any one of the eight vacuum tubes 630, 640 exciting the row coils 614, 620 and any one of the eight vacuum tubes 630, 640 exciting the column coils 616, 622, both the polarity of excitation and the compensating winding required are determined. A detailed explanation of the system shown is as follows:

Each toroidal element 600 has thereon six windings 602, 604, 606, 608, 610, 612 exclusive of a reading coil winding which is not shown, to simplify the drawing. All first windings 602 in one sense on each core 600 in a row are connected in series with each other to form row coils 614. A vacuum tube 630 is connected to one end of each row coil. All second windings 604 in one sense on each core in a column are connected in series with each other to form column coils 616. A vacuum tube 630 is connected to one end of each column coil. The sense of the windings of the row and column coils 614, 616 described thus far is such that, by the selection of the proper ones of these row and column coils, the element coupled to both is driven to have one polarity of magnetization (say P). All third windings 606 on every one of the cores, which are in the opposite sense to the row and column windings used to drive a core to P, are connected in series to form a first compensating coil 618. The coil 618 has one end connected to the source of B+ and the other end connected to the other ends of all the row and column coils 614, 616 used to drive the elements of the matrix to P. The fourth and fifth windings 608, 610 on each element are connected in series (in similar fashion to the first 602 and second 604 windings) to form row and column coils 620, 622, which are used to drive a selected core to condition N. The sixth winding 612 on every element corresponds to the third winding 606 except that it is of opposite sense. All sixth windings are connected in series to form a second compensating coil 624. The second compensating coil provides a magnetomotive force which opposes that due to the N driving row and column coils 620, 622. It is connected between B+ and one end of all the N driving row and column coils 620, 622. The other ends of the N driving row and column coils are connected to associated vacuum tubes 640.

Each one of the driving tubes 630, 640 are double tetrodes. The screen grids 636, 646 of each double tetrode are connected together and brought out to serve as the row and column address input terminals 650. The control grids 634, 644 of all of these tubes 634 are connected to two busses 652, 654 in order to determine driving polarity. Those control grids of the tubes driving the P driver row and column coils 614, 616 are connected to the P bus 652. Those control grids 636 of the tubes driving the N driver row and column coils 620, 622 are connected to the other N bus 654. Polarity is determined by deciding which one of the tubes which is primed for conduction by the address signals being applied to the screen grid is to conduct. The current which passes through the selected row coil and column coil must also pass through one of the compensating windings in series with them. To obtain the proper relation of excitations, the compensating winding in each element should have one-fourth of the turns of one row or column coil winding on that element. The total row and column coil excitation applied to an element is equivalent to four-thirds, requiring that the compensating coil excitation be equivalent to one-fourth. When a direct driven matrix as shown in Figure 6 is excited according to the schedule of Table I, it is obvious that there are no cumulative demagnetizations even on the unselected elements of the unselected lines, since there are as many compensating pulses in one direction as in the other.

A particularly useful application of the 3 to 1 discrimination system is that in the matrix driving matrices system. The signals which appear on unselected cores of the selected coils, because of non-negligible permeability at the residual magnetization point of these elements (N), may cause signals to be transmitted to the next matrix where these signals reduce the discrimination. The matrix of Fig. 7 may be considered as one of the driving matrices for an information storing matrix 16 x 16. Each core would then be provided with a secondary winding driving a particular line of the main matrix.

It was pointed out in my copending application Serial No. 264,217, above identified, that the driving matrices may have a common winding for restoration to state N, since the only two conditions in which these matrices could find themselves is either with all cores at N or with one core at P and the rest at N. When the 3 to 1 discrimination system is used with matrices driving a main information storing matrix, the restoration of the highest order driving matrices to state N should not be done by a common winding on these matrices themselves, but on the matrices which are used to drive them. If a restoring pulse is applied to the driving matrices themselves, it would have to be of an intensity sufficient to turn a selected core from P to N, consequently equal to the full turn-over amplitude or three times the amplitude of the compensating pulse. Because of the non-negligible permeability at residual magnetization, this pulse would produce fairly large disturbing signals on unselected lines of the main matrix. However, if a restoring pulse is applied to the matrices driving the highest order driving matrices—or even those driving the latter should there be such—the disturbing signals appearing on unselected lines due to the common restoring signal would not be transmitted to the main matrix.

Referring now to Fig. 7, there is shown a driving matrix 700 being driven by a row and column driver matrix each of which in turn is driven by a set of tubes 710, 720. Considering a set of the column driver tubes first, there are four tubes 720, each of which is associated with a toroidal magnetic element 704. The control grids 724 of these column driver tubes 720 serve as the binary address input. All the screen grids 716, 726 of all the row and column driver tubes are connected together and to a "P" polarity pulse source.

The first column driver tube 720 (from left in Fig. 7) has a coil as its plate load which consists of two series connected windings 732, 730 inductively coupled to a first and second of the column driving cores 704. The second column driver tube 720 is inductively coupled by two windings 730, 732 to a third and fourth of the column driving cores 704. The third of the driver set is coupled to the third and first column driver cores. The fourth of the driver set tubes has its two windings coupled to the second and fourth column driver cores. The tubes 710 driving the row driver cores also have coil plate loads consisting of two series connected windings 734, 736 which are connected to the row driving cores 702 in similar fashion. Excitation through two windings on any one core are required to turn that core over from N to P. Accordingly, a selection and rendering conductive of two tubes in the set is required to select and turn over a column driver element 704. The row driver requirements are similar. The 4 x 4 driven matrix has its row and columns of cores coupled to the respective row and column driver matrices by row 740 and column 742 coils. These include coupling resistances 744. These row and column coils 740, 742 are inductively coupled to an associated one of the row and column driver elements 702, 704. For preserving clarity in the drawing the inductive coupling portion of each row and column coil is shown adjacent instead of on its associated element.

A compensating coil 746 is inductively coupled to all the row and column driver elements 702, 704 by windings which are connected in series. A supplemental core 748 is also coupled to the compensating coil 746. This compensating coil 746 is connected between B+ and one end of all the coils which are the plate loads for the two sets of driving tubes 710, 720.

A common N restoring coil 750 is coupled by windings to all the row and driver cores or elements 702, 704 and also to the supplemental core 748. The common N restoring coil 750 is the plate load for an N restoring tube 752. The 4 x 4 matrix has a compensating coil 760 coupled to all the elements 700 and also to the supplemental core 748.

The operation of the system shown is briefly as follows: All driving cores including the supplementary core are initially in state N. The address and polarity P are selected. This has the effect of turning over one row driver and one column driver core 702, 704 to the condition P. These two cores induce currents in a row coil 740 and column coil 742 which turn over a selected element 700 in the matrix being driven. This also induces a compensating current in the compensating winding on the driving cores 702, 704. This current has the effect of turning over the supplemental core 750 from N to P, thus inducing a compensating current in the compensating winding 760 on the cores 700. Restoration of the cores from P to N is made by rendering the N restoring tube 752 conductive. This will also restore the supplemental core to N and a compensating current in the opposite direction will be induced in the compensating coil of the 4 x 4 matrix.

Two systems of the type shown in Figure 7 are used to drive a single 16 x 16 information holding matrix. For complete details of the matrix driving matrices system, one is referred to my copending application, Serial No. 264,217, above identified. The choice of polarity of the selected core in the main matrix may be obtained by simultaneous or successive N restorations of the row and column drivers or else and preferably by the use of an inhibiting pulse in an auxiliary winding on the main matrix.

Referring now to Fig. 8, there is shown an array of toroidal cores 800 having a reading winding 802 on each core which is connected in series to form the reading coil 804. Driving windings and inhibiting windings are omitted from this figure in order to preserve its clarity. It is to be noted that each winding 802 on a core 800 is in the opposite sense to the winding on adjacent cores. This checkerboard arrangement for the reading coil 804 insures a maximum discrimination between the wanted signal or absence of a signal from an element being read and spurious signals from the other elements.

When a core magnetized to state P or N (or $P+2n$) is driven partially towards N or P, a slight voltage is induced in its reading winding because of the non-ideally flat B–H characteristic near remanent magnetization and due to magnetic field leakage outside of the non-linear magnetic material. In the case of the two-to-one discrimination driving system, all the cores on the selected coils (except the selected one when it is being reversed to produce the desired signal), produce this slight voltage since they are driven by excitation equal to half that necessary to reverse the direction of magnetization. Since all the reading coils are in series, all these voltages add up. There is, consequently, a signal equal to $2(n-1)V_d$, where $V_d$ is the signal on one core due to partial demagnetization and $n$ is the side of the matrix $n\times n$. To this signal is added the desired signal $V_S$ when the selected core is reversed or a signal $V_D$ which is that due to driving a core with full excitation in the direction in which it is already magnetized. Consequently, the discrimination R in the reading signals is $$R=\frac{V_S+2(n-1)V_d}{V_D+2(n-1)V_d}$$

It is evident that this ratio tends to one for $n$ tending to infinity. For large $n$'s the ratio may be too close to one for practical use.

Another system to improve the situation is simply to buck out the voltage $2(n-1)V_d$ by an auxiliary circuit in series with the reading winding. Of course, this bucking voltage has to have the same time variation as the voltage $2(n-1)V_d$ which may be difficult to obtain. Also, such neutralization is a complication, and requires delicate adjustment.

The better system is the one wherein the directions of the reading windings on the cores are altered so as to obtain a "checkerboard" of winding directions as shown in Fig. 8. The disturbing voltages tend to cancel in this arrangement. In fact, with perfect uniformity of material properties and assuming symmetrical disturbance when excited in either direction, all these signals will cancel except a few. In the case of the straight two-to-one driving system where only the selected lines are excited, these signals will cancel by pairs on the selected lines. Consequently, the ratio R of desired to undesired signal will be $$R=\frac{V_s-2V_d}{V_D-2V_d}$$

since only the selected core and one other on each line have to be considered (for $n$ even). For a linear characteristic near the remanant magnetization $V_D=2V_d$, and consequently infinite signal-to-noise ratio would be obtained. Because this characteristic is not perfectly linear, the time dependence of $V_D$ and $V_d$ are not exactly identical and the cancellation of the $(n-1)$ pairs of signal is not perfect. Actually the wanted to unwanted signal ratio will be finite. However, it will be much higher than it is with the straight type of reading coil connections. Furthermore, this ratio is independent of the size of the matrix as long as perfect cancellation exists. If the concellation is not perfect, but there is a finite mean deviation of characteristics of the individual cores, it is easy to show that the additive terms to the desired signal and undesired signals will grow as $\sqrt{n}$ rather than $n$ and, of course, with a small coefficient multiplying $\sqrt{n}$.

For cancelling out spurious reading signals the arrangement wherein the windings of the reading coil have an opposite sense is not the only one possible. The reading coil windings may be arranged to have sense reversals on alternate elements or every alternate pair of elements. As long as the sense reversals nullify the spurious signals within each row and within each column these other reading coil winding systems may be used.

When the three-to-one system is used, the selected and unselected lines, i. e., all cores, give additional signals. If, again, we assume uniformity of core material and the same disturbing signal strength for both polarities, for all cores, then the ratio of desired to undesired signal will be:

$$R=\frac{V_s-V_S}{V_D-V_d}$$

Where Vs is the signal due to ⅓ excitation on the disturbed cores (identical on selected and unselected lines), since there is an odd total number of unselected cores (with $n$ even). This seems at first glance to be slightly worse than the ratio in the case of a two-to-one discrimination system. Actually Vs is much smaller than $V_d$ so that if the mean deviation of these voltages for imperfectly uniform materials are considered, it is likely that a better ratio will be obtained for the three-to-one system than the two-to-one. This may not be the case for very large matrices because the additive terms in the case of the three-to-one system increase proportionately with $n$, while only proportionately to $\sqrt{n}$ in the two to one system, since all the cores of the $n^2$ matrix are contributing in one case while only those of the selected lines in the other. Consequently, for given mean deviations of the core characteristics there will be a critical size of matrix below which the three-to-one system will be more advantageous than the two-to-one discrimination system. Of course, in any case, the checkerboard system of reading coil connections will be more advantageous than that having a uniform sense of windings.

A further improvement in the ratio of wanted to unwanted reading signals may be obtained by a proper time sampling or "strobing" of the reading signal. Signals due to imperfect unwanted signal-cancellation are characterized by having a lower amplitude and a more rapid decay time than the signal from the core being read if its polarity is changed by the reading. This occurs principally because the time for turnover of a selected core exceeds the time the unselected cores complete a small hysteresis loop in the saturated region. Accordingly, if the pulses used for querying are used as a reference, a sample taken from the output of the reading winding at an interval after the reference will contain a signal substantially all due to the selected core (if it is turned over in the reading). The selection of the interval may be readily established by viewing the signals on an oscilloscope.

There has been described herein a novel and improved magnetic memory system and apparatus which permits the use of materials in magnetic matrices driven directly or by other matrices which have non-rectangular B-H hysteresis characteristics by compensating for the deleterious effects due to such characteristics either in reading out of or writing into the system.

What is claimed is:

1. In a magnetic matrix memory system of the type including a plurality of magnetic elements, each of which represents information by the polarity at which it is magnetically saturated, and means to selectively apply magnetomotive forces to the magnetic elements of said memory to alter the polarity of magnetic saturation of a desired element, a method of preventing demagnetization of the elements comprising the steps of applying magnetomotive forces to a desired one of said elements, and then applying an opposing magnetomotive force to others of said elements whose magnetic condition is affected by the application of said magnetomotive forces to said desired one of said elements to substantially neutralize any changes in magnetic condition of said others of said elements.

2. In a magnetic matrix memory system of the type including a plurality of magnetic elements each of which represents stored information by the polarity at which it is magnetically saturated, and means to selectively apply magnetomotive forces to the magnetic elements of said memory to alter the polarity of magnetic saturation of a desired element, a method of preventing demagnetization of the elements comprising the steps of applying magnetomotive forces to a desired one of said elements, and simultaneously applying an opposing magnetomotive force to all of the elements in said matrix to substantially neutralize on others of said elements any effects caused by the application of said magnetomotive force to said desired one of said elements.

3. In a magnetic matrix memory system of the type including a plurality of magnetic elements each of which represents stored information by the polarity at which it is magnetically saturated, and means to selectively apply magnetomotive forces to the magnetic elements of said memory to alter the polarity of magnetic saturation of a desired element, a method of preventing demagnetization of the elements comprising the steps of applying magnetomotive forces to a desired one of said elements to drive said element to saturation at a polarity opposite to the one desired, and applying magnetomotive forces to said element to drive it to saturation at the polarity desired.

4. In a magnetic matrix memory system of the type including (1) a plurality of magnetic elements arrayed in rows and columns, (2) a plurality of row coils, all of the elements in each row being inductively coupled to a separate row coil, and (3) a plurality of column coils, all of the elements in each column being inductively coupled to a separate column coil, the method of preventing the demagnetization of elements of said system consisting of the steps of applying to one of said row coils and one of said column coils currents having a polarity to drive a selected element coupled to said excited coils to a condition of magnetic saturation which is opposite to the one desired for said selected element, and then applying to said ones of said row and column coils currents having a polarity to drive said selected element to the desired condition of magnetic saturation.

5. A method of preventing demagnetizations of the magnetic elements in a plurality of magnetic matrix memories, each matrix memory including a plurality of magnetic elements arranged in rows and columns, all of the elements in each row being inductively coupled to a separate row coil, all of the elements in each column being inductively coupled to a separate column coil, and an inhibiting coil inductively coupled to all the elements in said array, said method consisting of the steps of applying to a desired one of the row coils and to a desired one of the column coils of each matrix currents having a polarity to drive a magnetic element in each said matrix coupled to both said excited row and column coils to a first direction of magnetization, applying to said desired row and column coils currents having a polarity to drive said elements to their original direction of magnetization while simultaneously applying inhibiting currents to the inhibiting coils of the ones of said matrices in which it is desired to maintain said selected elements in said first direction of magnetization, and applying currents of reverse polarity to the ones of said inhibiting windings to which said inhibiting currents were applied.

6. In a magnetic matrix memory system of the type including (1) a plurality of magnetic elements arranged in rows and columns, (2) a plurality of row coils, all of the elements in each row being inductively coupled to a separate row coil, (3) a plurality of column coils, all of the elements in each column being inductively coupled to a separate column coil, and (4) a compensating coil inductively coupled to all of the elements in said memory, the method of preventing the demagnetization of said magnetic elements comprising the steps of applying to one of said row coils and to the one of said column coils which are coupled to a desired magnetic element currents to provide a magnetomotive force in excess of that required to drive said element to a desired saturation condition, and applying to said compensating winding a current having a polarity to provide a magnetomotive force substantially equal and opposite to the excess magnetomotive force applied to said desired element.

7. In a magnetic matrix memory system of the type including (1) a plurality of magnetic elements arranged in rows and columns, (2) a plurality of row coils, all of the elements in each row being inductively coupled to a different row coil, (3) a plurality of column coils all of the elements in each column being inductively coupled to a different column coil, the method of preventing the demagnetization of said magnetic elements comprising the steps of applying to the one of said row coils and to the one of said column coils which are coupled to a desired magnetic element currents to provide a magnetomotive force sufficient to drive said element to a desired condition of saturation, and applying to the remaining column coils and row coils current having a polarity to provide magnetomotive forces opposite and less than half the magnetomotive force applied to said desired element.

8. A magnetic matrix system comprising an information holding array consisting of a plurality of magnetic elements arranged in columns and rows, a plurality of row coils, all the elements in each row being inductively coupled to a separate row coil, a plurality of column coils, all the elements in each column being inductively coupled to a separate column coil, all the elements in said matrix being inductively coupled to a compensating winding; a row driver array having a plurality of magnetic elements each of which is inductively coupled to a different one of said row coils, a column driver array having a plurality of magnetic elements each of which is inductively coupled to a different one of said column coils, means to selectively drive to a desired condition of saturation one of said row driver elements and one of said column driver elements whereby a desired one of said information holding array elements inductively coupled to said driven ones of said row and column driver elements is substantially driven to saturation, and means to apply from said driven row and column elements into said compensating winding a compensating current to substantially neutralize in others of said information holding array elements the effects of driving said desired one of said elements.

9. A magnetic matrix system as described in claim 8 wherein said means to apply from said driven row and column elements into said compensating winding a compensating current includes a magnetic element inductively coupled to all the elements of said row and column driver array and with which said compensating winding is inductively coupled.

10. A magnetic matrix system comprising a plurality of magnetic elements arranged in rows and columns, a plurality of column coils, all of the elements in each column being inductively coupled to two different column coils, the sense of the two windings of the said two column coils being opposite, a plurality of row coils, all of the elements in each row being inductively coupled to two different row coils, the sense of the two windings of the said two row coils being opposite, a first compensating coil having serially connected windings on all said magnetic elements, a second compensating coil having serially connected windings on all said elements of opposite sense to said first compensating coil windings, means connecting one end of all said row coils and all said column coils having windings of one sense on each element with one end of the one of said compensating coils having windings of opposite sense, means connecting one end of all of the others of said row coils and said column coils to one end of the other compensating coil, means to apply a potential to the other ends of said compensating coils, and means connected to the other ends of each of said row coils and column coils to selectively determine through which one of said row coils and said column coils current can flow whereby the magnetic condition of an element at the intersection of the current bearing row and column coil is determined and current is drawn through one of said compensating coils to substantially compensate for the effects of the current drawn through said row and column coils.

11. A magnetic matrix system comprising a plurality of magnetic elements arranged in rows and columns, a plurality of column coils, all of the elements in each column being inductively coupled to a different column coil, a plurality of row coils, all of the elements in each row being inductively coupled to a different row coil, a compensating coil inductively coupled to all said magnetic elements by serially connected windings, the sense of said compensating coil windings being opposite to that of the row and column coils, potential applying means, and means to selectively apply currents from said potential applying means through one of said row coils and one of said column coils to determine the magnetic condition of the one of said magnetic elements coupled to said excited ones of said row and column coils, said compensating coil being coupled between said potential applying means and said means to selectively apply currents whereby the current drawn through said row and column coils is also drawn through said compensating coil.

12. A magnetic matrix system comprising a plurality of magnetic elements arranged in rows and columns, a plurality of column coils, all of the elements in each column being inductively coupled to a different column coil, a plurality of row coils, all of the elements in each row being inductively coupled to a different row coil, and a reading coil inductively coupled to all said elements, said reading coil including windings on each element which are serially connected, the sense of said winding on adjacent elements being opposite.

13. A magnetic matrix system comprising a plurality of magnetic elements arranged in rows and columns, a plurality of column coils, all of the elements in each column being inductively coupled to a different column coil, a plurality of row coils, all of the elements in each row being inductively coupled to a different row coil, and a reading coil inductively coupled to all said elements, said reading coil including windings on each element which are serially connected, the sense of said windings on each element being arranged to provide for each one of said rows of elements and each one of said columns of elements an equal number of windings which are of opposite sense.

14. A magnetic matrix system comprising a plurality of magnetic elements arranged in rows and columns, a plurality of column coils, all of the elements in each column being inductively coupled to a different column coil, a plurality of row coils, all of the elements in each row being inductively coupled to a different row coil, a compensating coil to which all of the elements are inductively coupled, and a reading coil to which all of said elements are inductively coupled, said reading coil including windings on each element which are serially connected, the sense of the winding on adjacent elements being opposite.

15. A magnetic matrix memory system comprising a plurality of magnetic elements, means to selectively drive a desired one of said elements from saturation at one magnetic polarity to saturation at the opposite magnetic polarity, and a reading coil to which all of the elements in said memory system are inductively coupled, said reading coil including windings on each element, the sense of said windings on one half of said elements being opposite to the sense of said windings on the remaining half of said elements.

References Cited in the file of this patent

An Electronic Digital Computor, Electronic Engineering (British), December 1950, pages 492–496.